(12) United States Patent
Chou

(10) Patent No.: US 12,115,900 B1
(45) Date of Patent: Oct. 15, 2024

(54) ANTI-FREEZE WINDING STRAP BINDER AND METHOD FOR MANUFACTURING THE BINDER

(71) Applicant: Strong Yun Industrial Co., Ltd., Taoyuan (TW)

(72) Inventor: Yeh-Chien Chou, Taoyuan (TW)

(73) Assignee: Strong Yun Industrial Co., Ltd., Taoyuan (TW)

( * ) Notice: Subject to any disclaimer, the term of this patent is extended or adjusted under 35 U.S.C. 154(b) by 35 days.

(21) Appl. No.: 18/186,288

(22) Filed: Mar. 20, 2023

(51) Int. Cl.
| | |
|---|---|
| *B60P 7/08* | (2006.01) |
| *B21C 23/08* | (2006.01) |
| *B21C 35/04* | (2006.01) |
| *B23K 31/02* | (2006.01) |

(52) U.S. Cl.
CPC ............ *B60P 7/0846* (2013.01); *B21C 23/08* (2013.01); *B21C 35/04* (2013.01); *B23K 31/02* (2013.01)

(58) Field of Classification Search
CPC .... Y10T 24/2175; B60P 7/0846; B21C 23/08; B21C 35/04; B23K 31/02
See application file for complete search history.

(56) References Cited

U.S. PATENT DOCUMENTS

| 3,428,331 A | * | 2/1969 | Morgan | B60P 7/083 410/100 |
| 4,045,002 A | * | 8/1977 | Miller | B60P 7/083 D34/33 |
| 5,156,506 A | * | 10/1992 | Bailey | B61D 45/003 410/100 |
| 6,665,910 B2 | * | 12/2003 | Huang | B60P 7/083 24/68 CD |
| 7,069,623 B2 | * | 7/2006 | Lu | B60P 7/083 24/69 ST |

* cited by examiner

*Primary Examiner* — Robert Sandy
(74) *Attorney, Agent, or Firm* — Chun-Ming Shih; LANWAY IPR SERVICES

(57) ABSTRACT

A load binder includes a U-shaped bracket, a pawl member, a ratchet wheel, a ratchet wheel module, a spool, and a driving shaft structure. The spool is disposed in the U-shaped bracket which has a first through hole and a second through hole. The spool has a first locking groove and a second locking groove. The pawl member is rotatably connected with the U-shaped bracket and meshes with the ratchet wheel. The ratchet wheel module is connected with the ratchet wheel and passes through the first through hole into the first locking groove. The ratchet wheel module is soldered to the spool and rotatably connected with the U-shaped bracket. The driving shaft structure passes through the second through hole into the second locking groove. The driving shaft structure is soldered to the spool and rotatably connected with the U-shaped bracket. A method is used for manufacturing the load binder.

10 Claims, 4 Drawing Sheets

ANTI-FREEZE WINDING STRAP BINDER AND METHOD FOR MANUFACTURING THE BINDER

BACKGROUND OF THE INVENTION

Field of the Invention

The present invention relates to a load binder and, more particularly, to an anti-freeze winding strap binder and a method for manufacturing the anti-freeze winding strap binder.

Description of the Related Art

An anti-freeze winding strap binder is used for a car to bind a cargo. The load binder uses industrial polyester straps or straps to bundle the transported cargo or goods by tightening the straps. A conventional anti-freeze winding strap binder includes a ratchet wheel shaft, a winding shaft, and a driving shaft. The ratchet wheel shaft, the winding shaft, and the driving shaft are made by casting, forging or stamping and are connected after working. A pry bar is inserted into pry holes of the driving shaft to rotate the driving shaft which in turn rotates the winding shaft and the ratchet wheel shaft to tighten the straps for binding the cargo. In addition, a ratchet wheel meshes with a pawl to prevent the winding shaft from being rotated reversely. Thus, the straps are tightened gradually to bundle the cargo. However, the ratchet wheel shaft, the winding shaft, and the driving shaft are worked by forging or stamping, so that the load binder has a weak structural strength. In addition, the working process is complicated, thereby increasing the cost of production.

BRIEF SUMMARY OF THE INVENTION

In accordance with the present invention, there is provided load binder comprising a U-shaped bracket, a pawl member, a ratchet wheel, a ratchet wheel module, a spool, and a driving shaft structure. The spool is disposed in the U-shaped bracket. The U-shaped bracket has a first end provided with a first through hole and a second end provided with a second through hole. The spool has a first end provided with a first locking groove and a second end provided with a second locking groove. The pawl member and the ratchet wheel are located outside of the first end of the U-shaped bracket. The pawl member is rotatably connected with the U-shaped bracket and meshes with the ratchet wheel. The ratchet wheel module has a first end connected with the ratchet wheel and a second end passing through the first through hole and inserted into the first locking groove. The ratchet wheel module is soldered to the spool and rotatably connected with the U-shaped bracket. The driving shaft structure passes through the second through hole and is inserted into the second locking groove. The driving shaft structure is soldered to the spool and rotatably connected with the U-shaped bracket.

In accordance with the present invention, there is further provided a method for manufacturing a load binder. The load binder comprises a U-shaped bracket, a ratchet wheel module, a spool, and a driving shaft structure. The ratchet wheel module includes a first inner tube and a first shaft. The driving shaft structure includes a second shaft, a second inner tube, and an outer tube. The method comprises the steps of working the first inner tube by cutting of an automatic sawing machine, forming the first shaft by extruding and working the first shaft by cutting of an automatic sawing machine, soldering the first inner tube and the first shaft together to construct the ratchet wheel module, working the second inner tube by cutting of an automatic sawing machine, working the outer tube by cutting of an automatic sawing machine, forming the second shaft by extruding and working the second shaft by cutting of an automatic sawing machine, soldering the second shaft, the second inner tube, and the outer tube together to construct the driving shaft structure, mounting the ratchet wheel module on the U-shaped bracket with the ratchet wheel module passing through a first end of the U-shaped bracket, soldering the ratchet wheel module to a first end of the spool, mounting the driving shaft structure on the U-shaped bracket with the driving shaft structure passing through a second end of the U-shaped bracket, and soldering the driving shaft structure to a second end of the spool.

According to the primary advantages of the present invention, the parts of the load binder are worked by cutting of an automatic sawing machine and are connected by soldering, so that the load binder has a reinforced strength of connection, has a lighter structure, saves the material, has a lower cost of production, and is operated safely and conveniently.

BRIEF DESCRIPTION OF THE SEVERAL VIEWS OF THE DRAWING(S)

DETAILED DESCRIPTION OF THE INVENTION

Figure 1:
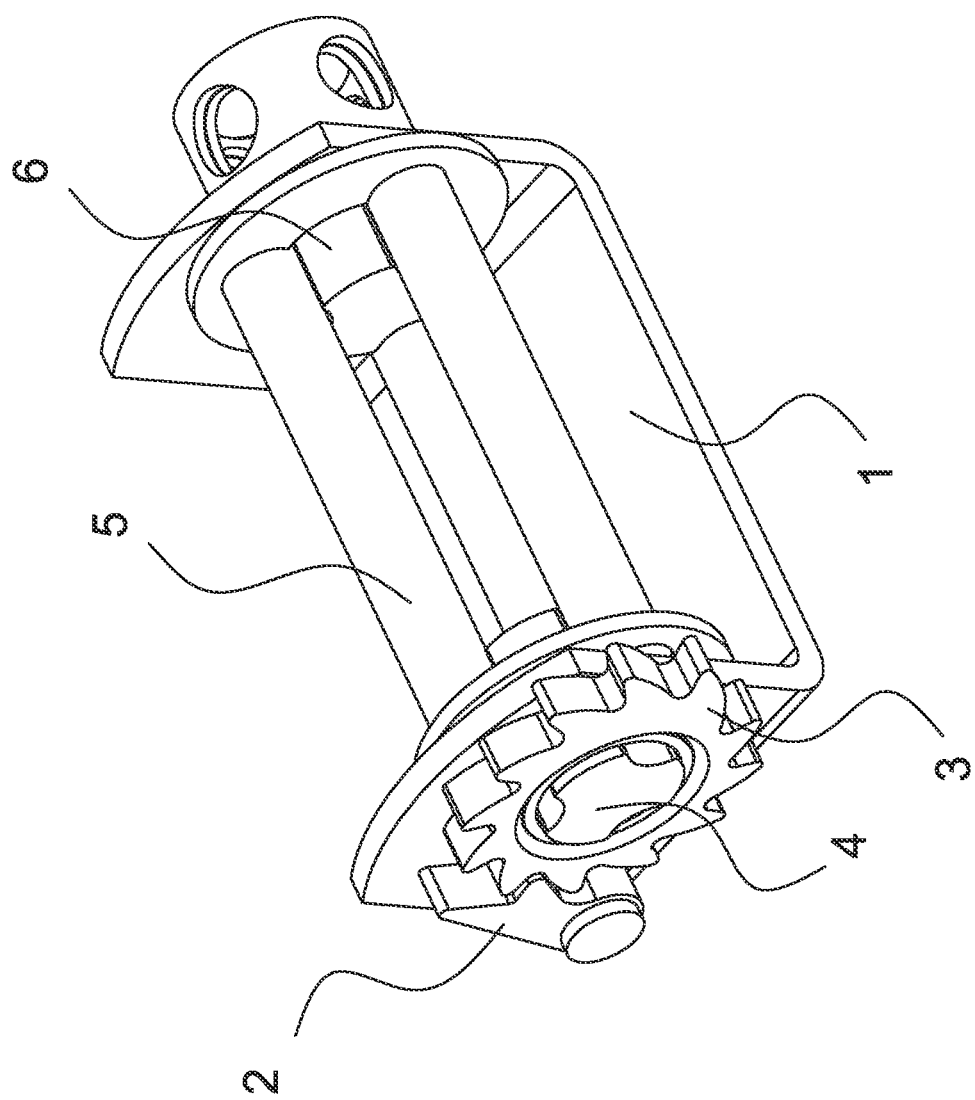
FIG. 1 is a perspective view of a load binder in accordance with the preferred embodiment of the present invention.
Figure 2:
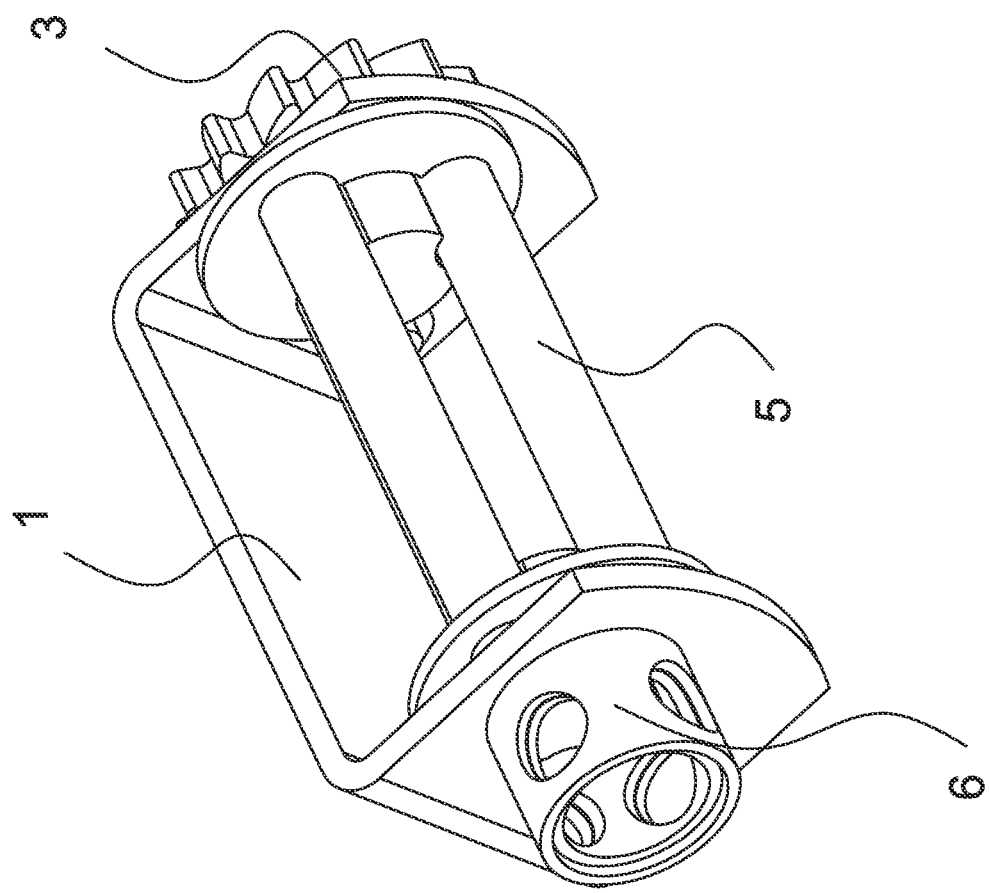
FIG. 2 is another perspective view of the load binder in accordance with the preferred embodiment of the present invention.
Figure 3:
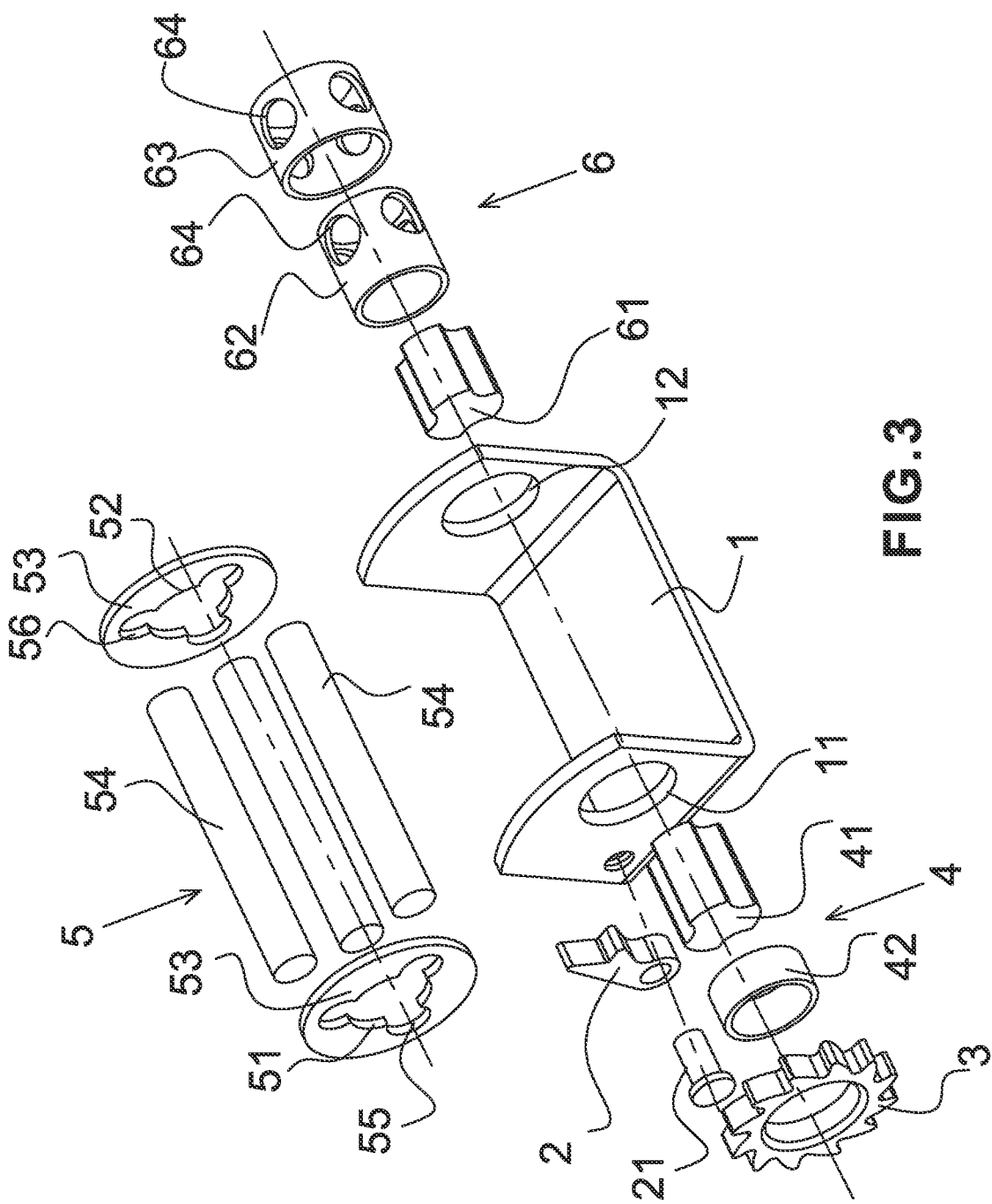
FIG. 3 is an exploded perspective view of the load binder in accordance with the preferred embodiment of the present invention.
Figure 4:
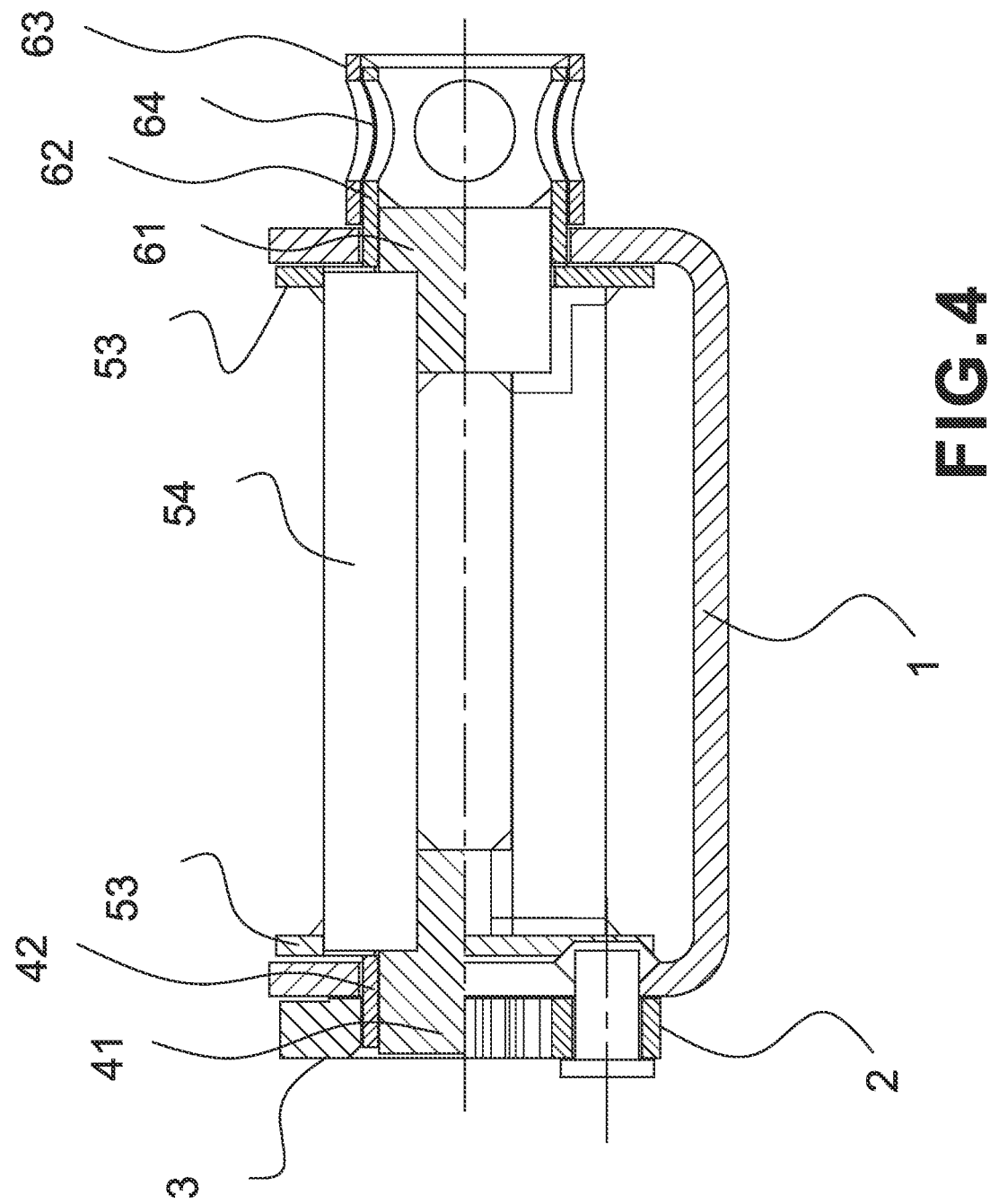
FIG. 4 is a cross-sectional view of the load binder in accordance with the preferred embodiment of the present invention.

Referring to FIGS. 1-4, a load binder in accordance with the preferred embodiment of the present invention comprises a U-shaped bracket 1, a pawl member 2, a ratchet wheel 3, a ratchet wheel module 4, a spool (or reel or bobbin) 5, and a driving shaft structure 6.

The spool 5 is disposed in the U-shaped bracket 1. The U-shaped bracket 1 has a first end provided with a first through hole 11 and a second end provided with a second through hole 12. The spool 5 has a first end provided with a first locking groove 51 and a second end provided with a second locking groove 52. The pawl member 2 and the ratchet wheel 3 are located outside of the first end of the U-shaped bracket 1. The pawl member 2 is rotatably connected with the U-shaped bracket 1 and meshes with the ratchet wheel 3. The ratchet wheel module 4 has a first end connected with the ratchet wheel 3 and a second end passing through the first through hole 11 and inserted into the first locking groove 51. The ratchet wheel module 4 is soldered (or welded) to the spool 5 and rotatably connected with the U-shaped bracket 1. The driving shaft structure 6 passes through the second through hole 12 and is inserted into the second locking groove 52. The driving shaft structure 6 is soldered (or welded) to the spool 5 and rotatably connected with the U-shaped bracket 1.

It is appreciated that, the ratchet wheel module 4 passes through the first through hole 11 and is inserted into the first locking groove 51 so that the ratchet wheel module 4 and the spool 5 are soldered mutually, while the driving shaft structure 6 passes through the second through hole 12 and is inserted into the second locking groove 52 so that the driving shaft structure 6 is soldered to the spool 5. In such a manner, when the driving shaft structure 6 is driven by a pry bar, the driving shaft structure 6 in turn drive the spool 5, the ratchet wheel module 4, and the ratchet wheel 3 to rotate in one direction only, to gradually tighten a strap (or tape or cable) for binding a cargo. In addition, the pawl member 2 meshes with the ratchet wheel 3 to prevent the ratchet wheel 3, the ratchet wheel module 4, and the spool 5 from being rotated reversely. Thus, the ratchet wheel module 4, the spool 5, and the driving shaft structure 6 are soldered mutually so that the load binder has a reinforced strength, has a light weight, saves the material, has a low cost of fabrication, and is operated safely and conveniently.

In the preferred embodiment of the present invention, the spool 5 includes two retaining rings 53 and multiple winding bars (or poles or sticks or rods) 54. The first locking groove 51 is formed in one of the two retaining rings 53 and the second locking groove 52 is formed in the other one of the two retaining rings 53. The ratchet wheel module 4 has a peripheral face abutting a peripheral wall of the first locking groove 51. The driving shaft structure 6 has a peripheral face abutting a peripheral wall of the second locking groove 52. The peripheral wall of the first locking groove 51 is provided with multiple first mounting openings 55. The peripheral wall of the second locking groove 52 is provided with multiple second mounting openings 56. Each of the winding bars 54 has a first end inserted into one of the first mounting openings 55 and a second end inserted into one of the second mounting openings 56. The first end of each of the winding bars 54 rests on the ratchet wheel module 4, and the second end of each of the winding bars 54 rests on the driving shaft structure 6.

It is appreciated that, one of the two retaining rings 53 is formed with the first locking groove 51 and the first mounting openings 55, and the other one of the two retaining rings 53 is formed with the second locking groove 52 and the second mounting openings 56, so that the ratchet wheel module 4, the driving shaft structure 6, and the winding bars 54 are mounted on and retained by the two retaining rings 53. Thus, the mounting process is performed conveniently.

In the preferred embodiment of the present invention, the first end of each of the winding bars 54 is soldered (or welded) to one of the two retaining rings 53, and the second end of each of the winding bars 54 is soldered (or welded) to the other one of the two retaining rings 53, so that the load binder has an enhanced strength of connection by soldering to increase the safety of the load binder.

In the preferred embodiment of the present invention, the spool 5 includes three winding bars 54 which are arranged on a periphery of each of the two retaining rings 53 and equally spaced in a circumferential direction of each of the two retaining rings 53. Thus, the load binder is a 3 bars winch for cargo-retaining strap.

In the preferred embodiment of the present invention, the ratchet wheel module 4 includes a first inner tube 42 and a first shaft 41. The ratchet wheel 3 is mounted on the first inner tube 42. The first inner tube 42 is inserted into the first through hole 11. The first shaft 41 has a first end inserted into the first inner tube 42 and soldered (or welded) to the first inner tube 42 and a second end inserted into the first locking groove 51 and soldered (or welded) to the spool 5.

Thus, the first shaft 41 has a protecting function. The first shaft 41 is inserted into and rotated in the first through hole 11 to enhance the stability of the first shaft 41. In addition, the first shaft 41 of the ratchet wheel module 4 and the spool 5 are soldered together to enhance the strength and stability of connection.

In the preferred embodiment of the present invention, the first inner tube 42 is soldered (or welded) to the ratchet wheel 3.

In practice, the first inner tube 42 is worked by an automatic sawing (or cutting) machine, and the first shaft 41 is formed by extruding and worked by an automatic sawing machine. The first inner tube 42 and the first shaft 41 are soldered together to construct the ratchet wheel module 4. The first inner tube 42 the ratchet wheel 3 are soldered together to enhance the strength of connection. In addition, the ratchet wheel module 4 is operated safely and conveniently.

In the preferred embodiment of the present invention, the driving shaft structure 6 includes a second shaft 61, a second inner tube 62, and an outer tube 63. The second inner tube 62 is inserted into the second through hole 12. The second shaft 61 has a first end inserted into the second inner tube 62 and soldered (or welded) to the second inner tube 62 and a second end inserted into the second locking groove 52 and soldered (or welded) to the spool 5. The outer tube 63 is mounted on the second inner tube 62. Each of the second inner tube 62 and the outer tube 63 is provided with multiple pry (or stick or bar) holes 64.

Thus, the second shaft 61 has a protecting function. The second inner tube 62 is inserted into and rotated in the second through hole 12 to enhance stability of the second shaft 61. The pry bar is inserted into the pry holes 64 of the second inner tube 62 and the outer tube 63 for rotating the driving shaft structure 6 to enhance the stability. The second shaft 61 of the driving shaft structure 6 and the spool 5 are soldered together to enhance the strength and stability of connection. The operator uses the pry bar to drive the driving shaft structure 6 for binding the cargo. Thus, the driving shaft structure 6 has a simple construction and is operated conveniently. The driving shaft structure 6 contains parts that are made easily to increase the working efficiency and decrease the cost of production.

In the preferred embodiment of the present invention, the outer tube 63 is soldered (or welded) to the second inner tube 62.

In practice, the second inner tube 62 is worked by an automatic sawing machine, the outer tube 63 is worked by an automatic sawing machine, and the first shaft 41 is formed by extruding and worked by an automatic sawing machine. The second shaft 61, the second inner tube 62, and the outer tube 63 are soldered together to construct the driving shaft structure 6. The first outer tube 63 and the second inner tube 62 are soldered together to enhance the strength of connection. In addition, the driving shaft structure 6 is operated safely and conveniently.

In the preferred embodiment of the present invention, a pin 21 extends through a first end of the pawl member 2 and is secured to the U-shaped bracket 1 so that the first end of the pawl member 2 is pivotally connected with the U-shaped bracket 1 by the pin 21. The pawl member 2 has a second end meshing with the ratchet wheel 3.

Thus, the pawl member 2 is connected with the U-shaped bracket 1 by the pin 21 so that the pawl member 2 is mounted on the U-shaped bracket 1 conveniently and is operated safely and conveniently.

In the preferred embodiment of the present invention, a method is used for manufacturing a load binder.

The load binder comprises a U-shaped bracket 1, a ratchet wheel module 4, a spool 5, and a driving shaft structure 6. The ratchet wheel module 4 includes a first inner tube 42 and a first shaft 41. The driving shaft structure 6 includes a second shaft 61, a second inner tube 62, and an outer tube 63.

The method comprises the steps of working the first inner tube 42 by cutting of an automatic sawing machine, forming the first shaft 41 by extruding and working the first shaft 41 by cutting of an automatic sawing machine, soldering the first inner tube 42 and the first shaft 41 together to construct the ratchet wheel module 4, working the second inner tube 62 by cutting of an automatic sawing machine, working the outer tube 63 by cutting of an automatic sawing machine, forming the second shaft 61 by extruding and working the second shaft 61 by cutting of an automatic sawing machine, soldering the second shaft 61, the second inner tube 62, and the outer tube 63 together to construct the driving shaft structure 6, mounting the ratchet wheel module 4 on the U-shaped bracket 1 with the ratchet wheel module 4 passing through a first end of the U-shaped bracket 1, soldering the ratchet wheel module 4 to a first end of the spool 5, mounting the driving shaft structure 6 on the U-shaped bracket 1 with the driving shaft structure 6 passing through a second end of the U-shaped bracket 1, and soldering the driving shaft structure 6 to a second end of the spool 5.

In the preferred embodiment of the present invention, the method further comprises respectively forming at least one pair of pry holes 64 in each of the second inner tube 62 and the outer tube 63 by drilling.

Accordingly, the parts of the load binder are worked by cutting of an automatic sawing machine and are connected by soldering, so that the load binder has a reinforced strength of connection, has a lighter structure, saves the material, has a lower cost of production, and is operated safely and conveniently.

The invention claimed is:

1. A load binder comprising:
   a U-shaped bracket, a pawl member, a ratchet wheel, a ratchet wheel module, a spool, and a driving shaft structure;
   wherein:
   the spool is disposed in the U-shaped bracket;
   the U-shaped bracket has a first end provided with a first through hole and a second end provided with a second through hole;
   the spool has a first end provided with a first locking groove and a second end provided with a second locking groove;
   the pawl member and the ratchet wheel are located outside of the first end of the U-shaped bracket;
   the pawl member is rotatably connected with the U-shaped bracket and meshes with the ratchet wheel;
   the ratchet wheel module has a first end connected with the ratchet wheel and a second end passing through the first through hole and inserted into the first locking groove;
   the ratchet wheel module is soldered to the spool and rotatably connected with the U-shaped bracket;
   the driving shaft structure passes through the second through hole and is inserted into the second locking groove; and
   the driving shaft structure is soldered to the spool and rotatably connected with the U-shaped bracket.

2. The load binder as claimed in claim 1, wherein:
   the spool includes two retaining rings and multiple winding bars;
   the first locking groove is formed in one of the two retaining rings and the second locking groove is formed in the other one of the two retaining rings;
   the ratchet wheel module has a peripheral face abutting a peripheral wall of the first locking groove;
   the driving shaft structure has a peripheral face abutting a peripheral wall of the second locking groove;
   the peripheral wall of the first locking groove is provided with multiple first mounting openings;
   the peripheral wall of the second locking groove is provided with multiple second mounting openings; and
   each of the winding bars has a first end inserted into one of the first mounting openings and a second end inserted into one of the second mounting openings.

3. The load binder as claimed in claim 2, wherein the first end of each of the winding bars is soldered to one of the two retaining rings, and the second end of each of the winding bars is soldered to the other one of the two retaining rings.

4. The load binder as claimed in claim 1, wherein:
   the ratchet wheel module includes a first inner tube and a first shaft;
   the ratchet wheel is mounted on the first inner tube;
   the first inner tube is inserted into the first through hole; and
   the first shaft has a first end inserted into the first inner tube and soldered to the first inner tube and a second end inserted into the first locking groove and soldered to the spool.

5. The load binder as claimed in claim 4, wherein the first inner tube is soldered to the ratchet wheel.

6. The load binder as claimed in claim 1, wherein:
   the driving shaft structure includes a second shaft, a second inner tube, and an outer tube;
   the second inner tube is inserted into the second through hole;
   the second shaft has a first end inserted into the second inner tube and soldered to the second inner tube and a second end inserted into the second locking groove and soldered to the spool;
   the outer tube is mounted on the second inner tube; and
   each of the second inner tube and the outer tube is provided with multiple pry holes.

7. The load binder as claimed in claim 6, wherein the outer tube is soldered to the second inner tube.

8. The load binder as claimed in claim 1, wherein:
   a pin extends through a first end of the pawl member and is secured to the U-shaped bracket so that the first end of the pawl member is pivotally connected with the U-shaped bracket by the pin; and
   the pawl member has a second end meshing with the ratchet wheel.

9. A method for manufacturing a load binder:
   wherein:
   the load binder comprises a U-shaped bracket, a ratchet wheel module, a spool, and a driving shaft structure;
   the ratchet wheel module includes a first inner tube and a first shaft;
   the driving shaft structure includes a second shaft, a second inner tube, and an outer tube;
   the method comprises:
   working the first inner tube by cutting of an automatic sawing machine;
   forming the first shaft by extruding and working the first shaft by cutting of an automatic sawing machine;

soldering the first inner tube and the first shaft together to construct the ratchet wheel module;

working the second inner tube by cutting of an automatic sawing machine;

working the outer tube by cutting of an automatic sawing machine;

forming the second shaft by extruding and working the second shaft by cutting of an automatic sawing machine;

soldering the second shaft, the second inner tube, and the outer tube together to construct the driving shaft structure;

mounting the ratchet wheel module on the U-shaped bracket with the ratchet wheel module passing through a first end of the U-shaped bracket;

soldering the ratchet wheel module to a first end of the spool;

mounting the driving shaft structure on the U-shaped bracket with the driving shaft structure passing through a second end of the U-shaped bracket; and soldering the driving shaft structure to a second end of the spool.

10. The method as claimed in claim 9, further comprising:

respectively forming at least one pair of pry holes in each of the second inner tube and the outer tube by drilling.

* * * * *